(12) United States Patent
Nahvi

(10) Patent No.: US 11,768,796 B2
(45) Date of Patent: Sep. 26, 2023

(54) TECHNIQUES FOR BUS INTERVAL TIMING MANAGEMENT IN A USB EXTENSION SYSTEM

(71) Applicant: Icron Technologies Corporation, Burnaby (CA)

(72) Inventor: Mohsen Nahvi, City of North Vancouver (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

(21) Appl. No.: 17/704,957

(22) Filed: Mar. 25, 2022

(65) Prior Publication Data

US 2022/0309022 A1 Sep. 29, 2022

Related U.S. Application Data

(60) Provisional application No. 63/167,524, filed on Mar. 29, 2021.

(51) Int. Cl.
*G06F 13/42* (2006.01)
*G06F 13/40* (2006.01)

(52) U.S. Cl.
CPC ...... *G06F 13/4282* (2013.01); *G06F 13/4068* (2013.01); *G06F 2213/0042* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 7,046,693 B1 | 5/2006 | Lapointe et al. | |
| 8,898,354 B2 | 11/2014 | Kejser | |
| 10,061,726 B2 | 8/2018 | McGowan et al. | |
| 10,467,694 B2 * | 11/2019 | Katsuyama | G06Q 30/08 |

* cited by examiner

*Primary Examiner* — Henry Tsai
*Assistant Examiner* — Juanito C Borromeo
(74) *Attorney, Agent, or Firm* — CHRISTENSEN O'CONNOR JOHNSON KINDNESS PLLC

(57) ABSTRACT

Techniques for generating bus interval messages by a downstream USB extension device in a USB extension environment are disclosed. The downstream USB extension device transmits a first outgoing bus interval message in response to receiving a first incoming bus interval message at a first time. An expected time of receipt of a second incoming bus interval message is determined based on the first time. The downstream USB extension device transmits a second outgoing bus interval message at a second time based on a difference between the reception time and the expected time of receipt if the second incoming bus interval message has been received at a reception time before the expected time of receipt. The downstream USB extension device transmits the second outgoing bus interval message at the expected time of receipt if the second incoming bus interval message has not been received before the expected time of receipt.

20 Claims, 13 Drawing Sheets

TECHNIQUES FOR BUS INTERVAL TIMING MANAGEMENT IN A USB EXTENSION SYSTEM

CROSS REFERENCE TO RELATED APPLICATION

This application claims the benefit of Provisional Application No. 63/167,524, filed Mar. 29, 2021, the entire disclosure of which is hereby incorporated by reference herein for all purposes.

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 2.0, April 2000; updated as Revision 3.0 in November 2008; released as Universal Serial Bus 3.1 Specification Revision 1.0 in July 2013; released as Universal Serial Bus 3.2 Specification Revision 1.0 on Sep. 22, 2017, and subsequent updates and modifications that are backward compatible therewith, including but not limited to the Universal Serial Bus 4.0 Specification—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under Revision 3.2 of the USB Specifications, Super-Speed connections are provided that use a 5 Gbps (Gen 1) or 10 Gbps (Gen 2) signaling rate. Though the specification does not mandate any particular maximum cable length, in practical terms the timing mandates and signaling techniques require a regular copper cable used for a SuperSpeed connection between a host and a device to be at most 3 meters long to properly support the SuperSpeed connection. Therefore, new techniques are needed to optionally allow for extension of a SuperSpeed USB device to a greater distance from the host to which it is coupled, such that SuperSpeed USB packets may be propagated between the host and the USB device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method for generating bus interval messages by a downstream USB extension device in a USB extension environment is provided. The downstream USB extension device transmits, via a USB downstream facing port, a first outgoing bus interval message in response to receiving a first incoming bus interval message from an upstream USB extension device via an extension medium at a first time. The downstream USB extension device determines an expected time of receipt of a second incoming bus interval message based on the first time. In response to determining that the second incoming bus interval message has been received at a reception time that is before the expected time of receipt, the downstream USB extension device transmits, via the USB downstream facing port, a second outgoing bus interval message at a second time based on a difference between the reception time and the expected time of receipt. In response to determining that the second incoming bus interval message has not been received before the expected time of receipt, the downstream USB extension device transmits, via the USB downstream facing port, the second outgoing bus interval message at the expected time of receipt.

In some embodiments, a USB extension device configured to perform such a method is provided.

In some embodiments, a system comprising an extension medium and a USB extension device is provided. The USB extension device is communicatively coupled to the extension medium and is configured to perform a method as described above.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
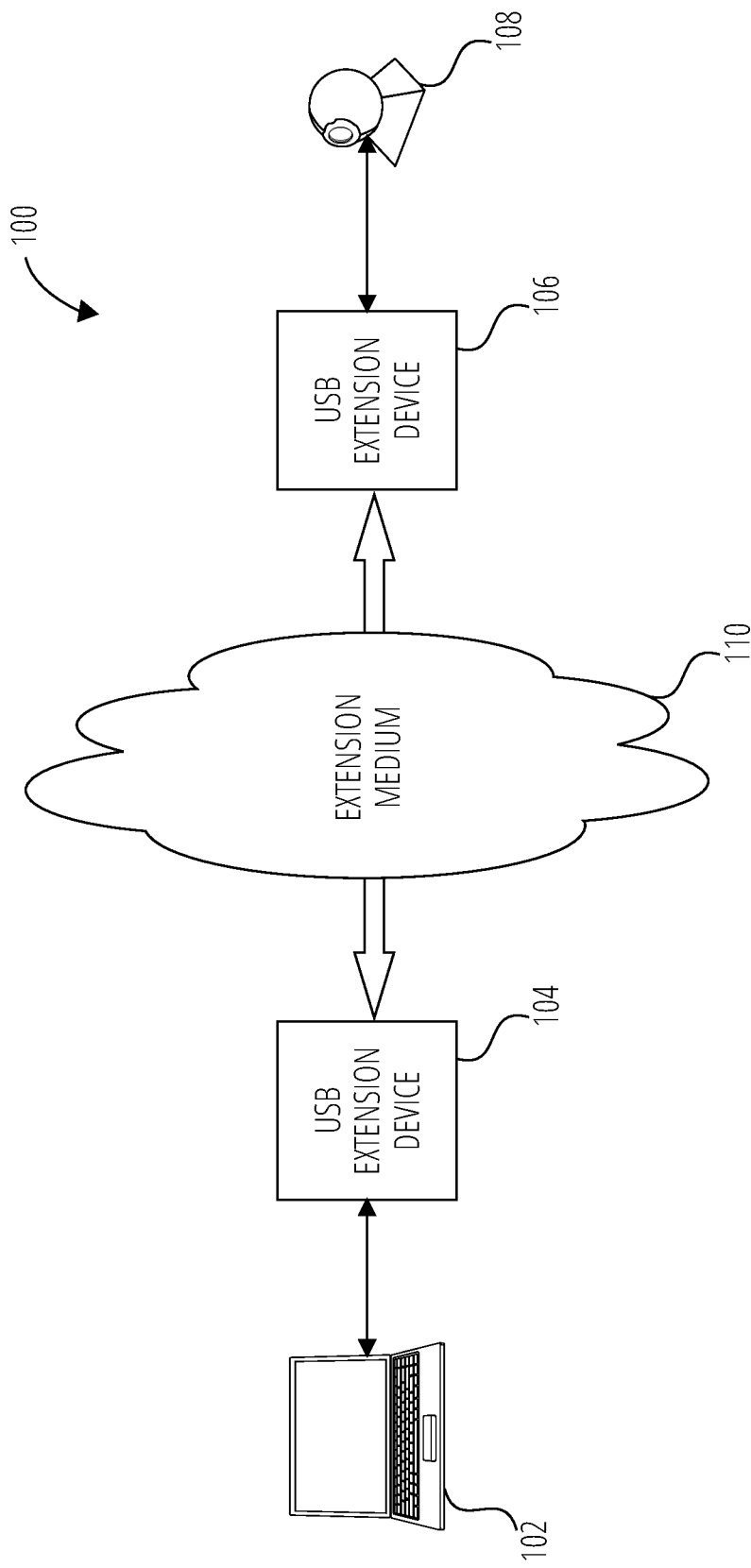
FIG. 1 is a block diagram that illustrates a non-limiting example embodiment of a system for extending USB communication according to various embodiments of the present disclosure.

FIG. 1 is a block diagram that illustrates a non-limiting example embodiment of a system 100 for extending USB communication according to various aspects of the present disclosure. The system 100 includes a host device 102 and a USB device 108. Traditionally, the host device 102 and the USB device 108 would be directly connected via a USB cable, and would communicate directly with one another via a protocol that conforms to a USB specification, such as USB 1.0, USB 1.1, USB 2.0, USB 3.0, or USB 3.1. As discussed above, such a connection would be limited to a short distance between the host device 102 and the USB device 108 due to the timing requirements of the USB specification.

The host device 102 may be any type of computing device containing a USB host controller. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host device 102 is connected via a USB protocol to an upstream USB extension device 104 (also known as an upstream facing port device or UFP device) and the USB device 108 is connected via a USB protocol to a downstream USB extension device 106 (also known as a downstream facing port device or DFP device). The UFP device 104 and the DFP device 106 are communicatively coupled via an extension medium 110 such as a network that may increase the distance between the host device 102 and the USB device 108 beyond that supported by the USB specification. The extension medium 110 and communication thereon may include any suitable networking technology, such as Ethernet, Bluetooth, WiFi, WiMax, the Internet, fiber optic point-to-point transmission, and/or the like, and any suitable communication medium, such as via physical cables, via fiber optic cable, via wireless spectrum, and/or the like.

In some embodiments, the UFP device 104 and the DFP device 106 may happen to be closer to each other than the short USB requirement distance, and/or may be directly connected by a cable instead of via a network, but retain the capability of overcoming increased latency between the host device 102 and the USB device 108 that is introduced by the use of an extension medium 110 that does not comply with the USB specifications.

One feature provided by the UFP device 104 and DFP device 106 is that they hide the presence of the extension medium 110 from the host device 102 and the USB device 108. In other words, UFP device 104 and DFP device 106 handle communication over the extension medium 110 and compensate for any additional latency introduced thereby, but the host device 102 and the USB device 108 behave as if they were connected directly via a USB specification-compliant connection. Accordingly, the host device 102 and the USB device 108 can communicate via the UFP device 104 and DFP device 106 without any non-standard software or hardware re-configuration on the host device 102 or USB device 108.

Figure 2:
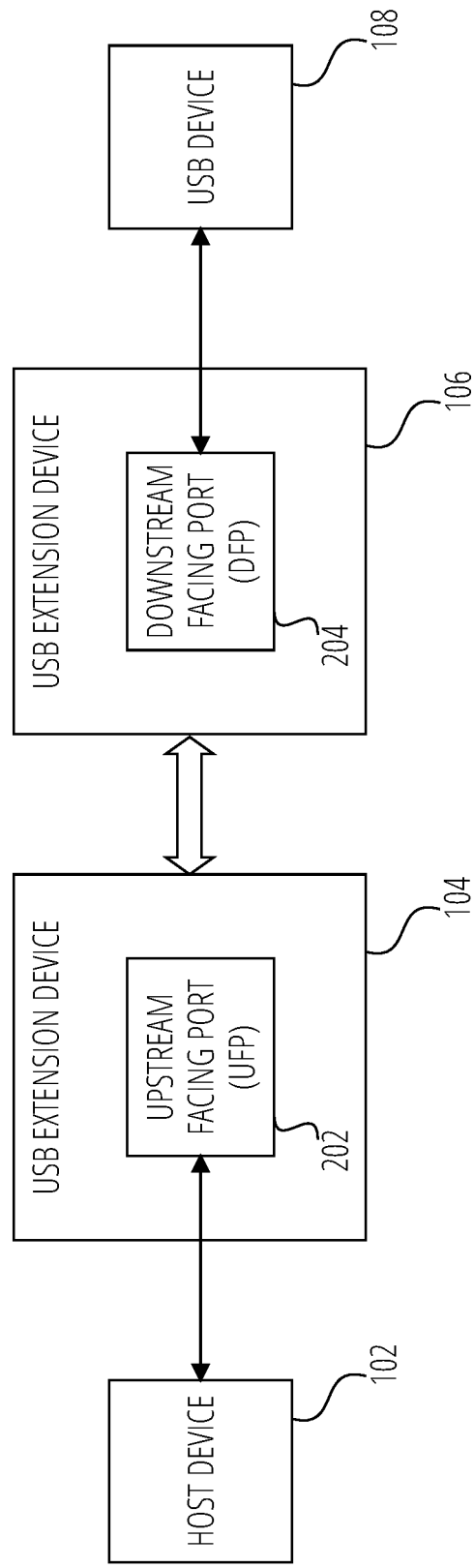
FIG. 2 is a block diagram that illustrates further details of the upstream USB extension device and downstream USB extension device illustrated in FIG. 1.

FIG. 2 is a block diagram that illustrates further details of the UFP device 104 and DFP device 106 illustrated in FIG. 1. The UFP device 104 includes an upstream facing port 202, and the DFP device 106 includes a downstream facing port 204. As used herein, the terms "upstream facing port" and the corresponding acronym "UFP" may be used interchangeably, as may the terms "downstream facing port" and the corresponding acronym "DFP." Likewise, because the upstream USB extension device 104 includes an upstream facing port 202, the upstream USB extension device 104 may also be called a "UFP device," and because the downstream USB extension device 106 includes a downstream facing port 204, the downstream USB extension device 106 may also be called a "DFP device."

The UFP device 104 is configured at least to communicate with the host device 102 via a USB-standard-compliant protocol using the upstream facing port 202, and to exchange messages and USB bus traffic with the DFP device 106 via the extension medium 110. The DFP device 106 is configured at least to communicate with the USB device 108 via a USB-standard-compliant protocol using the downstream facing port 204, and to exchange messages and USB bus traffic with the UFP device 104 via the extension medium 110. The UFP device 104 and the DFP device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the UFP device 104 is connected to a downstream facing port of the host device 102, and the downstream facing port 204 of the DFP device 106 is connected to an upstream facing port of a USB device 108. In other embodiments, the upstream facing port 202 of the UFP device 104 may be connected to a downstream facing port other than one provided by a host device 102, such as a downstream facing port of a hub, and/or the like. Likewise, in other embodiments, the downstream facing port 204 of the DFP device 106 may be connected to an upstream facing port other than one provided by a USB device 108, such as an upstream facing port of a hub, and/or the like. The discussion below is primarily in terms of the simple topology illustrated in FIG. 2, but one of ordinary skill in the art will recognize that in some embodiments similar techniques may be used in other topologies without departing from the scope of the present disclosure.

Figure 3:
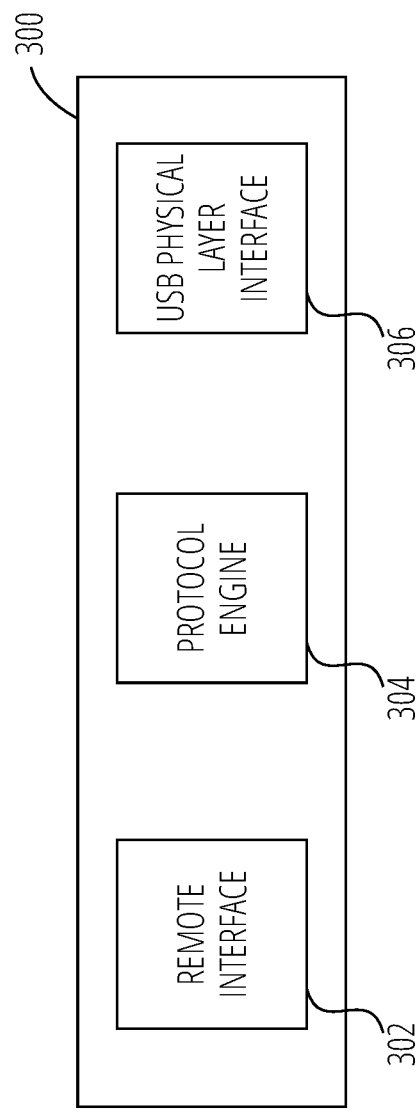
FIG. 3 is a block diagram that illustrates an exemplary embodiment of a port device according to various aspects of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a protocol engine 304, a USB physical layer interface 306, and a remote interface 302. In some embodiments, the protocol engine 304 may be configured to provide and/or execute the logic discussed below with regard to the UFP device 104 and/or the DFP device 106. The protocol engine 304 may instruct the USB physical layer interface 306 to apply the appropriate electrical signals to the USB physical layer in order to communicate with the USB device 108 or the host device 102. Likewise, the protocol engine 304 may instruct the remote interface 302 to exchange information with the remote USB extension device.

In some embodiments, the protocol engine 304 may be implemented within a logic device such as a PLD, an ASIC, a FPGA, and/or the like. In other embodiments, the protocol engine 304 may be implemented within a computing device having at least one processor and a memory containing computer-executable instructions that, if executed by the at least one processor, cause the protocol engine 304 to perform the actions discussed below; a dedicated digital hardware device implemented, for example, as a state machine configured to perform the actions described; within an application specific processor; and/or within any other suitable computing device. In some embodiments, the protocol engine 304 (or other component of the port device 300) may include a computer-readable memory usable to cache data packets, as discussed further below.

In some embodiments, logic of actions attributed to a USB extension device is executed by a protocol engine 304, which then instructs a USB physical layer interface 306 and/or a remote interface 302 to perform the appropriate communication steps associated with the logic. Throughout the discussion below, such actions may simply be described as being performed by the UFP device 104 or the DFP device 106 as if it was a single device for ease of discussion. One of ordinary skill in the art will recognize that actions attributed directly to the UFP device 104 or the DFP device 106 may actually be performed by a protocol engine 304, a USB physical layer interface 306, a remote interface 302, and/or some other component of the USB extension device.

In SuperSpeed USB communication, a host device 102 generates isochronous timestamp packets, also referred to as ITP packets, bus interval packets, and/or bus interval messages. The bus interval messages deliver timestamps to all active devices, and are multicast from the host device 102 to all active devices. The bus interval messages are used to synchronize one or more USB devices 108 with the host. Typically, the bus interval messages are generated by the host device 102 at a predetermined rate, such as at 125 µs intervals, plus or minus tolerances defined in the USB Specification. In USB communication over USB-standard media, communication between the host device 102 and the USB devices 108 is over a reliable link, and so the bus interval messages are received by the USB devices 108 at the same rate at which they are generated by the host device 102.

Figure 4:
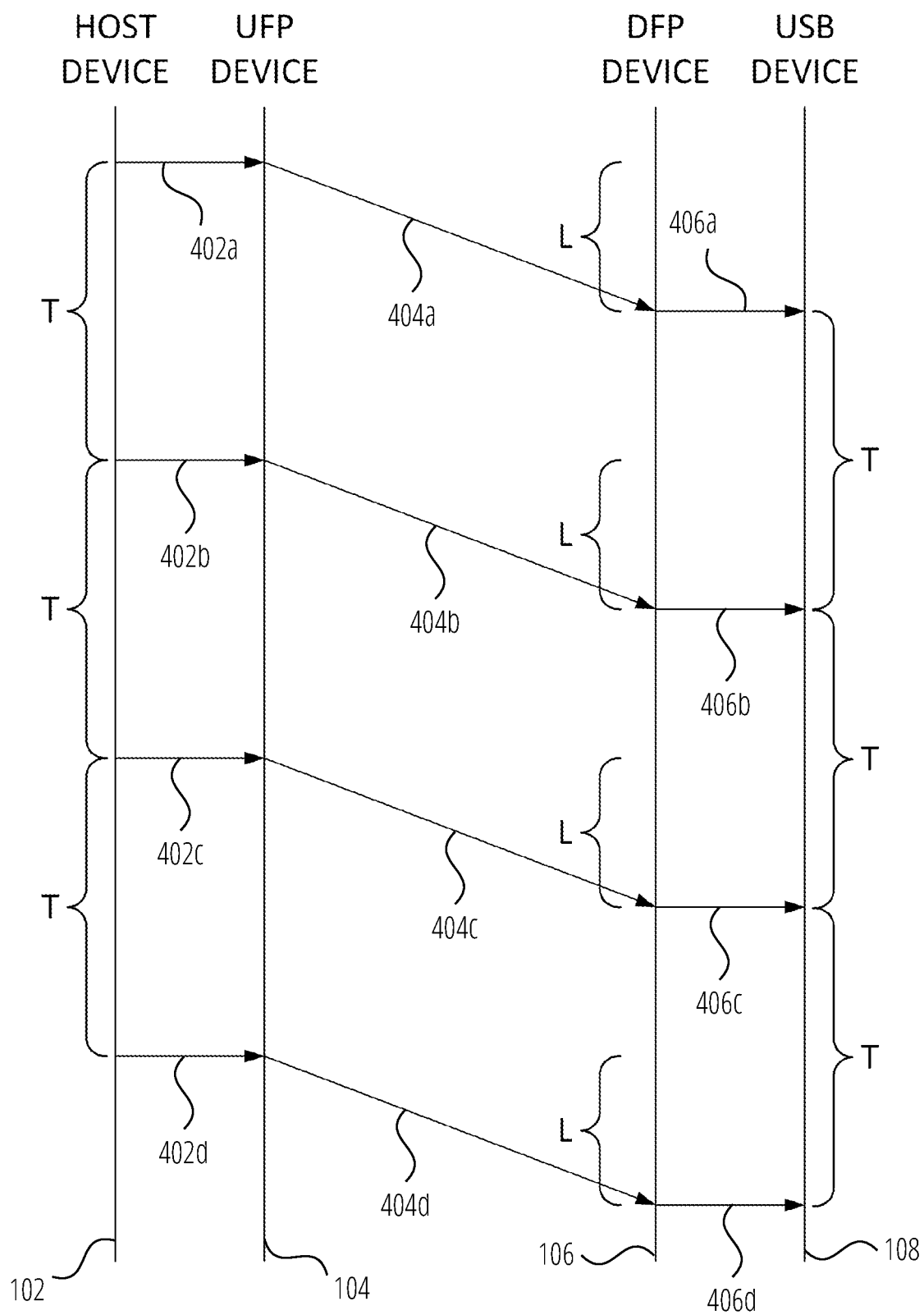
FIG. 4 is a sequence diagram that illustrates transmission of bus interval messages within an extension environment having constant latency according to various aspects of the present disclosure.

FIG. 4 is a sequence diagram that illustrates transmission of bus interval messages within an extension environment having constant latency according to various aspects of the present disclosure. In the sequence diagram of FIG. 4 (as well as in the other sequence diagrams included in this disclosure), time advances in a vertical direction downward. Arrows indicate transmission of messages between devices indicated by the vertical lines. If arrows are horizontal, they indicate communication according to timings as specified by the USB Specifications. If arrows are slanted, they indicate communication with latency that may be greater than amounts allowed by the USB Specifications. Labeled braces indicate amounts of time, which may or may not be to scale.

In FIG. 4, the host device 102 transmits packets to a UFP device 104 via a USB-compliant connection. The UFP device 104 then transmits packets to a DFP device 106 via a non-USB-compliant extension medium 110, and the DFP device 106, in turn, transmits packets to one or more USB devices 108 via USB-compliant connections. This is similar to the system 100 illustrated in FIG. 1 and described above.

As shown, the host device 102 generates original bus interval messages 402a-402d at a fixed rate, separated by a time T, which is typically 125 µs. The UFP device 104 receives the original bus interval messages 402a-402d, and transmits incoming bus interval messages 404a-404d to the DFP device 106 via the extension medium 110. The bus interval messages transmitted by the UFP device 104 to the DFP device 106 are described herein as "incoming" bus interval messages because they are "incoming" from the point of view of the DFP device 106. The names of the incoming bus interval messages (and the other types of bus interval messages) used herein are for the purposes of disambiguation, and should not be seen as limiting the types of suitable messages.

In some embodiments, the incoming bus interval messages 404a-404d may simply be re-transmitted versions of the original bus interval messages 402a-402d. In some embodiments, the incoming bus interval messages 404a-404d may encapsulate the original bus interval messages 402a-402d in another message format. In some embodiments, the incoming bus interval messages 404a-404d may include altered versions of the original bus interval messages 402a-402d. For example, the incoming bus interval messages 404a-404d may include versions of the versions of the original bus interval messages 402a-402d that have an altered delta field in their isochronous timestamp (see Table 8-26 in Revision 3.2 of the USB Specification). In some embodiments, the incoming bus interval messages 404a-404d may be triggered by the original bus interval messages 402a-402d, but may not include content from the original bus interval messages 402a-402d.

Once the DFP device 106 receives each of the incoming bus interval messages 404a-404d, the DFP device 106 transmits an outgoing bus interval message 406a-406d to one or more USB devices 108 via USB-compliant communication links. The receipt of each of the incoming bus interval messages 404a-404d by the DFP device 106 is delayed by an amount of latency, signified by L.

In FIG. 4, the latency experienced across the extension medium 110 is constant. Accordingly, the interval between each of the outgoing bus interval messages 406a-406d is T, and matches the interval at which the original bus interval messages 402a-402d are generated by the host device 102. This is an ideal scenario, and although the bus intervals generated by the DFP device 106 are offset from the bus intervals generated by the host device 102 by L, the rate at which the bus intervals are generated match and so synchronization of communication with the USB devices 108 should not be adversely affected.

Figure 5:
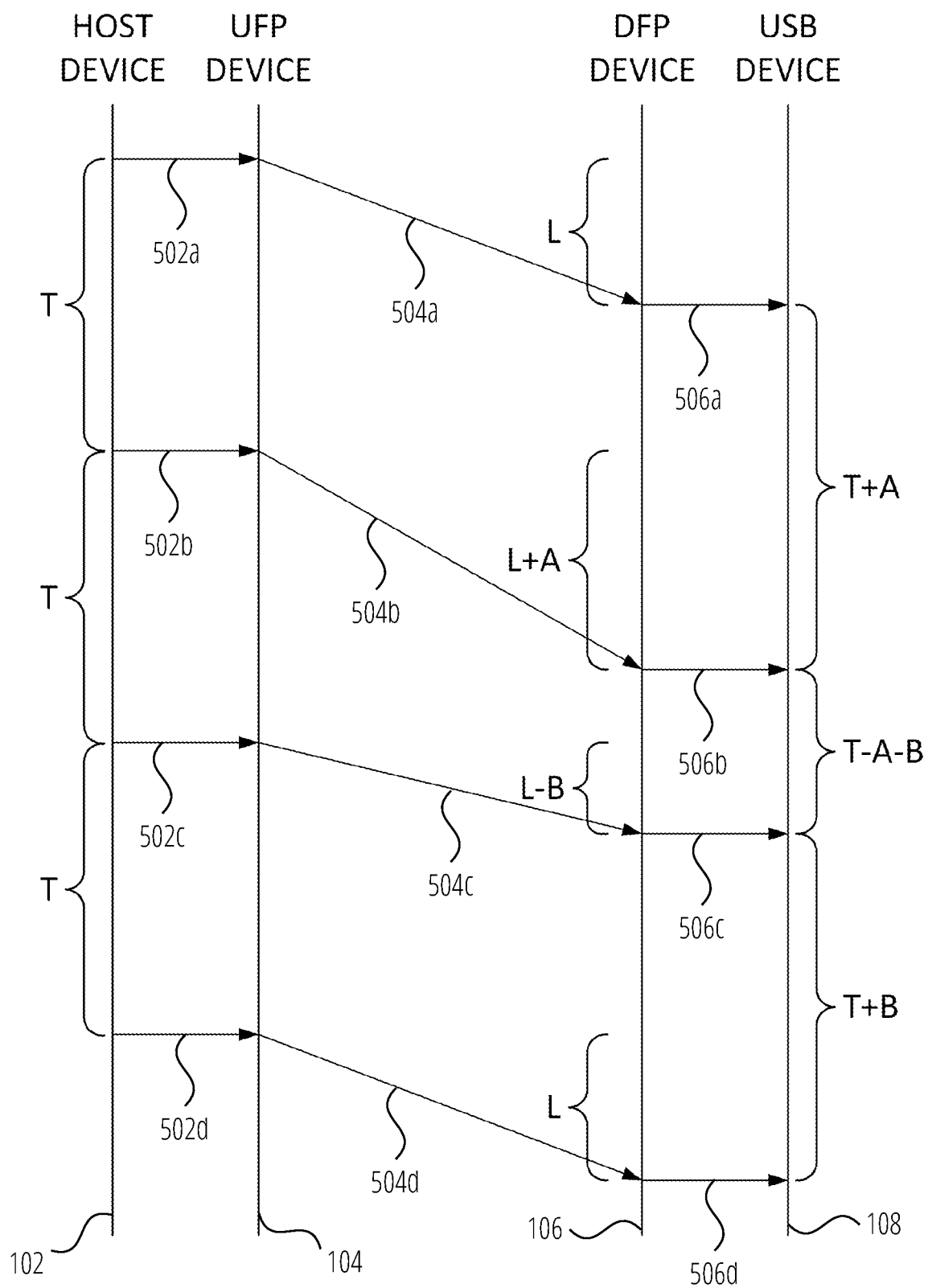
FIG. 5 is a sequence diagram that illustrates a scenario in which the extension medium experiences variable amounts of latency.

FIG. 5 is a sequence diagram that illustrates a more realistic scenario, in which the extension medium 110 experiences variable amounts of latency. This could happen for any number of reasons. For example, the extension medium 110 may include a wireless medium, and transient conditions between wireless endpoints may change. As another example, the extension medium 110 may not be exclusively used by the UFP device 104 and DFP device 106, and so traffic from other devices accessing the extension medium 110 may change the amount of latency between the UFP device 104 and the DFP device 106.

In FIG. 5, the host device 102 again generates original bus interval messages 502a-502d at a fixed rate separated by a time T, and the UFP device 104 generates incoming bus interval messages 504a-504d in response to receiving the original bus interval messages 502a-502d. However, the amount of latency over the extension medium 110 changes over time. For example, the amount of latency experienced by the first incoming bus interval message 504a is L (perhaps an expected amount of latency), the amount of latency experienced by the second incoming bus interval message 504b is L+A (the expected amount of latency plus an amount A), the amount of latency experienced by the third incoming bus interval message 404c is L-B (the expected amount of latency minus an amount B), and the amount of latency experienced by the fourth incoming bus interval message 504d is L (back to the expected amount of latency).

As can be seen, the errors introduced by the changing amounts of latency is compounded once the DFP device 106 generates its outgoing bus interval messages 506a-506d. A gap between the first outgoing bus interval message 506a and the second outgoing bus interval message 506b is T+A (the time interval T plus the amount of additional latency A experienced by the incoming bus interval message 504b). Worse, the gap between the second outgoing bus interval message 506b and the third outgoing bus interval message 506c is affected by both changes in latency, because the second incoming bus interval message 504b arrived "late" by the time A and the third incoming bus interval message 504c arrived "early" by the time "B," meaning that the gap between the second outgoing bus interval message 506b and the third outgoing bus interval message 506b, instead of being T, is T-A-B. Finally, the gap between the third outgoing bus interval message 506c and the fourth outgoing bus interval message 506d is affected by the third incoming bus interval message 504c arriving early, and so is longer than T by the amount B by which the incoming bus interval message 504c is early.

Accordingly, out of three intervals between outgoing bus interval messages 506a-506d, all three intervals are different from the bus interval time T generated by the host device 102, and errors in latency have compounded. These compounded errors can easily cause the outgoing bus interval messages 506a-506d to be generated at a rate that is outside the requirements of the USB Specifications, and thereby cause communication between the host device 102 and the USB devices 108 to fail.

Some attempts have been made to overcome issues of latency on the extension medium 110 in the generation of outgoing bus interval messages. For example, in some previous techniques, the DFP device 106 may generate outgoing bus interval messages at a standard rate that is determined solely by the DFP device 106 without reference to the incoming bus interval messages received from the UFP device 104. While this would guarantee that the outgoing bus interval messages would be generated at an expected rate, different intrinsic clock rates between the host device 102 and the DFP device 106 tend to cause the bus intervals generated by the separate devices to drift apart, and for the host device 102 to lose synchronization with the USB devices 108 because of it within a few seconds.

As another example, in some previous techniques, the DFP device 106 may measure an amount of latency on the extension medium 110 by performing test transmissions between the UFP device 104 and the DFP device 106, and may generate outgoing bus interval messages based on the measured amount of latency. Unfortunately, these techniques are suboptimal because they require a great amount of additional computation by the UFP device 104 and the DFP device 106 to determine the amount of latency, and they also require repeated recomputation of the measured latency to respond to changes in the latency on the extension medium 110.

As still another example, in some previous techniques, the DFP device 106 may attempt to predict a clock rate of the host device 102 and/or the UFP device 104 based on a rate at which the incoming bus interval messages are received, or may determine an average or rolling average time between received incoming bus interval messages, and may generate the outgoing bus interval messages based on the predicted rate. While these techniques may generate outgoing bus interval messages at a rate that is similar to those generated by the host device 102, they may still be vulnerable to changes in latency on the extension medium 110 that occur between predictions of the clock rate.

What is needed are techniques for efficiently generating bus interval messages at the DFP device 106 that are not unduly affected by changing amounts of latency on the extension medium 110, and that allow the host device 102 to remain in sync with the USB devices 108 communicatively coupled thereto via the UFP device 104 and the DFP device 106.

Figure 6:
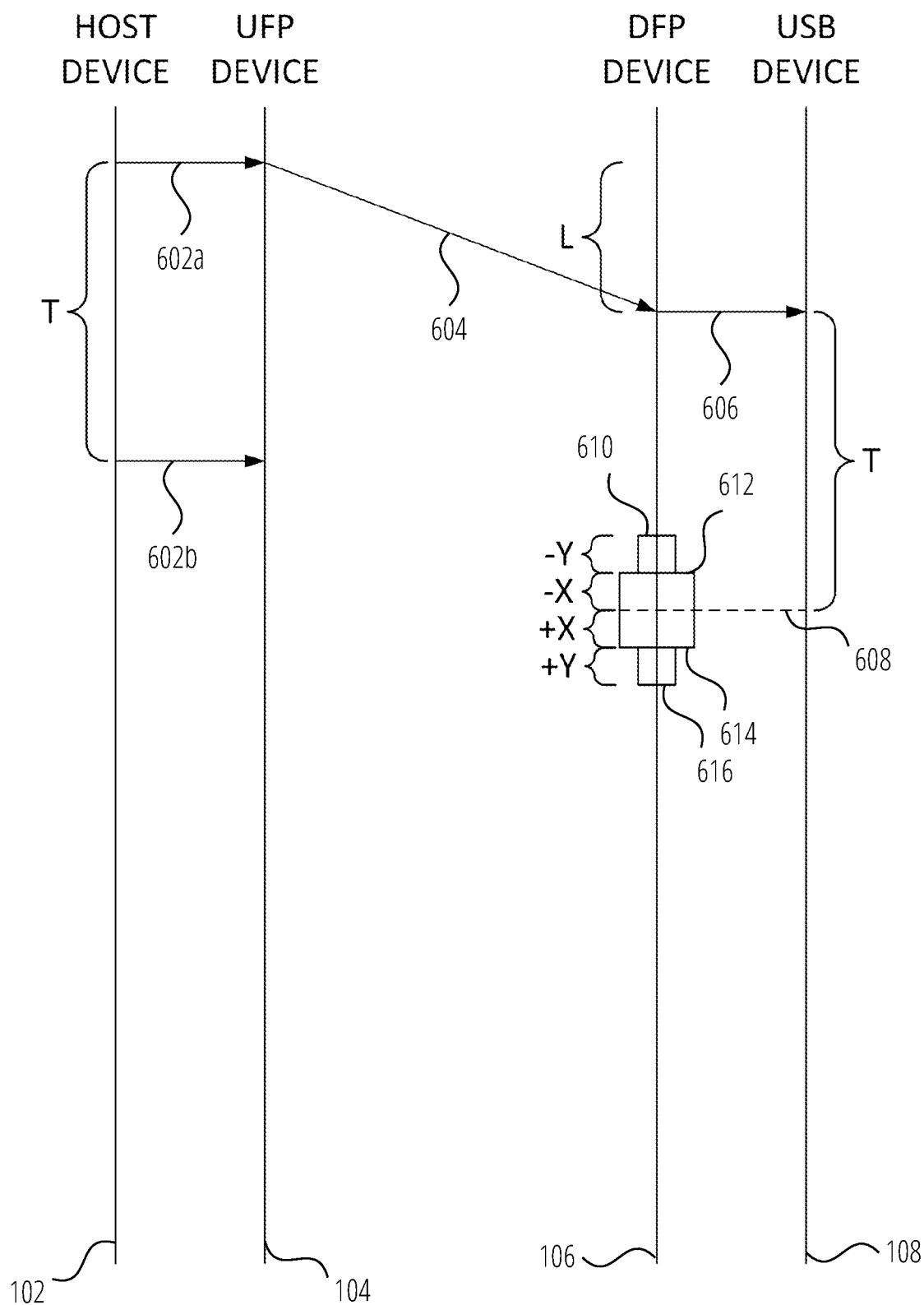
FIG. 6 is a partial sequence diagram that illustrates aspects of a non-limiting example embodiment of a technique for generating outgoing bus interval messages according to various aspects of the present disclosure.

FIG. 6 is a partial sequence diagram that illustrates aspects of a non-limiting example embodiment of a technique for generating outgoing bus interval messages according to various aspects of the present disclosure.

In FIG. 6, the host device 102 again transmits original bus interval messages 602a-602b at a rate separated by a time T, which is typically a standard time of 125 µs. In response to receiving the first original bus interval message 602a, the UFP device 104 transmits an incoming bus interval message 604 to the DFP device 106, which experiences an amount of latency L. In response to receiving the incoming bus interval message 604, the DFP device 106 generates a first outgoing bus interval message 606.

To this point, this is similar to the other techniques discussed above. However, in the embodiment illustrated in FIG. 6, additional steps are taken in order to handle differing amounts of latency on the extension medium 110. In response to receiving the first outgoing bus interval message 606, the DFP device 106 establishes an expected time of receipt 608. The expected time of receipt 608 follows the time of the receipt of the incoming bus interval message 604 by the amount of time T, which is typically the same standard time used by the host device 102 as the basis for generation of the original bus interval messages.

Around the expected time of receipt 608, the DFP device 106 establishes a soft threshold and a hard threshold. The soft threshold extends from an earlier soft threshold time 612 that is a period X before the expected time of receipt 608 to a later soft threshold time 614 that is a period X after the expected time of receipt 608. The hard threshold extends from an earlier hard threshold time 610 that is a period Y before the expected time of receipt 608 (and is before the earlier soft threshold time 612) to a later hard threshold time 616 that is a period Y after the expected time of receipt 608 (and is after the later soft threshold time 614).

In some embodiments, the earlier soft threshold time 612 may be 1 µs before the expected time of receipt 608 and the later soft threshold time 614 may be 1 µs after the expected time of receipt 608 (or about 1% of T). In some embodiments, the earlier hard threshold time 610 may be 5 µs before the expected time of receipt 608 and the later hard threshold time 616 may be 5 µs after the expected time of receipt 608

(or about 5% of T). Though these periods of time have been empirically shown to be effective, in some embodiments, other values may be used. Also, though illustrated and described as symmetrical, in some embodiments, the soft threshold may not extend for equal times before and after the expected time of receipt 608, and/or the hard threshold may not extend for equal times before and after the expected time of receipt 608. The soft and hard thresholds help specify behavior performed by the DFP device 106 upon receiving a subsequent incoming bus interval message, as discussed further below.

Figure 7A:
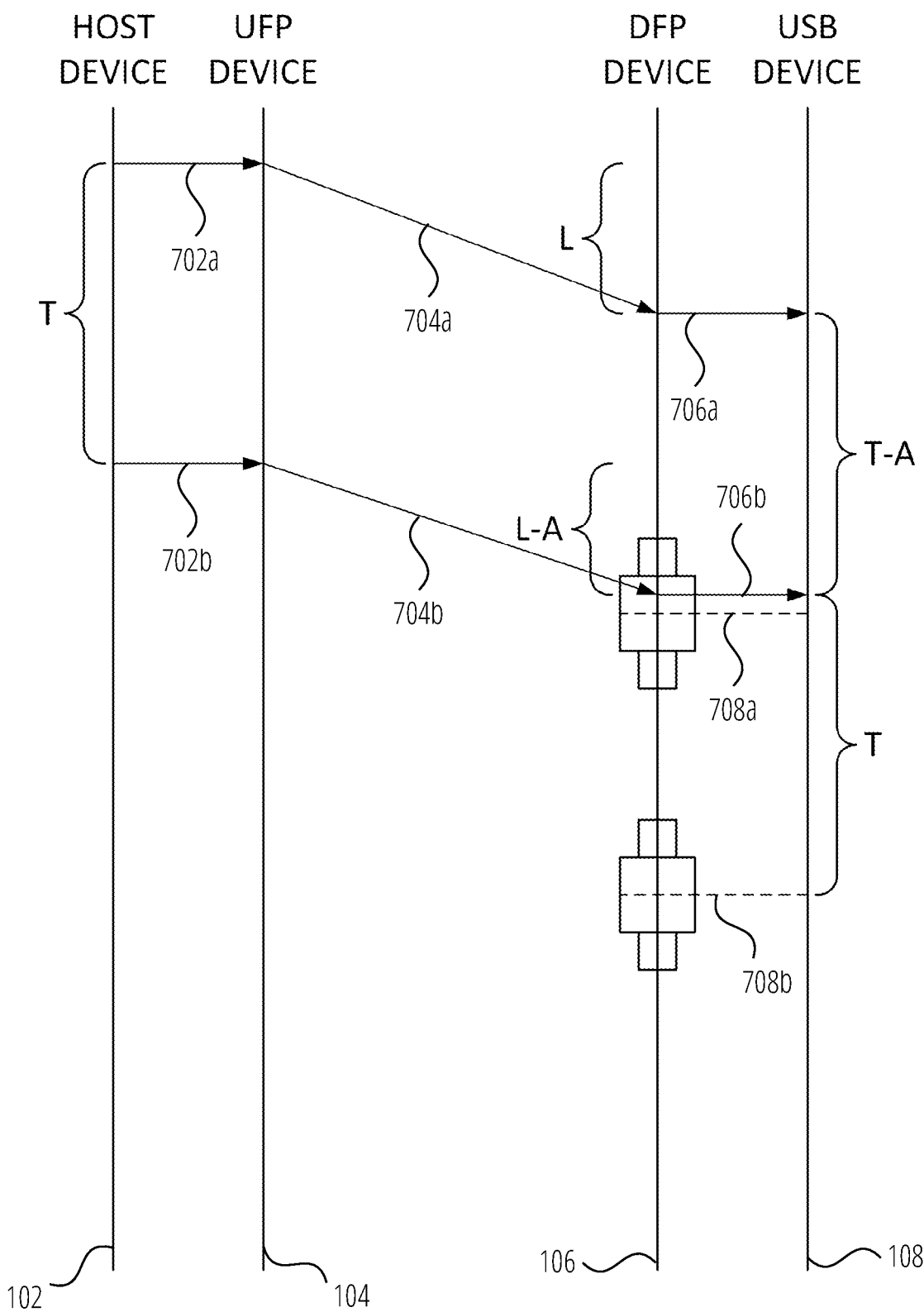
FIG. 7A and FIG. 7B are sequence diagrams that illustrate actions taken by a DFP device upon receiving an incoming bus interval message within a soft threshold according to various aspects of the present disclosure.
Figure 7B:
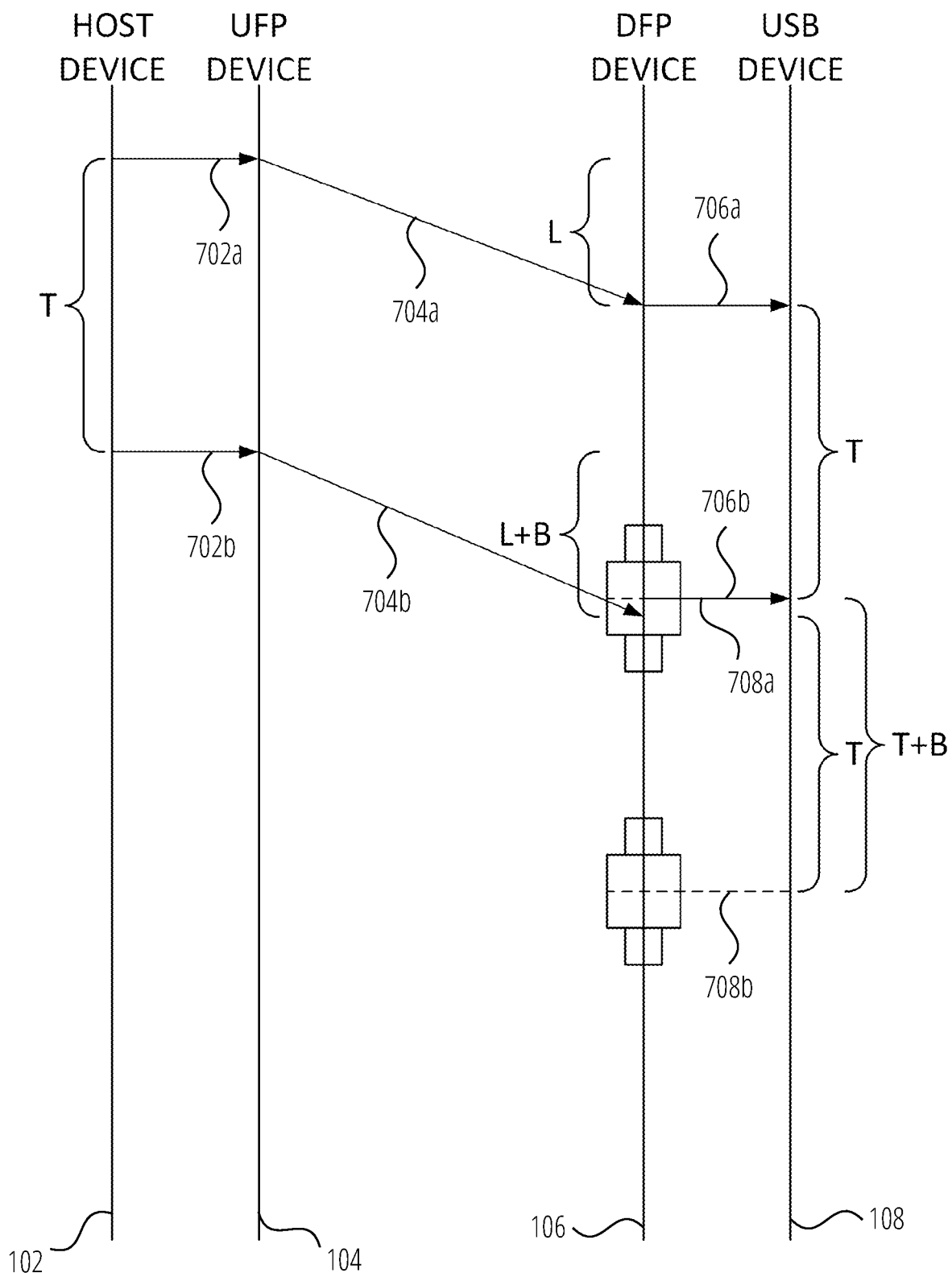

FIG. 7A and FIG. 7B are sequence diagrams that illustrate actions taken by a DFP device 106 upon receiving an incoming bus interval message within a soft threshold according to various aspects of the present disclosure. In FIG. 7A, the incoming bus interval message is received between an expected time of receipt and an earlier soft threshold time, while in FIG. 7B, the incoming bus interval message is received between the expected time of receipt and a later soft threshold time. One will recognize that in FIG. 7A, FIG. 7B, and all subsequent figures, the earlier hard threshold time 610, earlier soft threshold time 612, later soft threshold time 614, and later hard threshold time 616 are not labeled so as to not unnecessarily clutter the drawings, but that the wider boxes illustrated over the DFP device 106 represent the soft threshold and the thinner boxes illustrated over the DFP device 106 represent the hard threshold in the same way as illustrated and labeled in FIG. 6.

In FIG. 7A, the first original bus interval message 702a is generated by the host device 102, a first incoming bus interval message 704a is generated by the UFP device 104, and is received by the DFP device 106. In response, the DFP device 106 transmits the first outgoing bus interval message 706a, and establishes the first expected time of receipt 708a at a time T after the time of receipt of the first incoming bus interval message 704a (as described in FIG. 6).

The host device 102, after the time period T, generates a second original bus interval message 702b. The UFP device 104 transmits a second incoming bus interval message 704b to the DFP device 106. The second incoming bus interval message 704b experiences a smaller amount of latency on the extension medium 110 than the first incoming bus interval message 704a (smaller by an amount A), and so the second incoming bus interval message 704b arrives at the DFP device 106 during the soft threshold (that is, between the first expected time of receipt 708a and the earlier soft threshold time).

In response to receiving the second incoming bus interval message 704b between the earlier soft threshold time and the expected time of receipt 708a, the DFP device 106 transmits a second outgoing bus interval message 706b as soon as possible after receiving the second incoming bus interval message 704b. The DFP device 106 also establishes a second expected time of receipt 708b that is after the time of receipt of the second incoming bus interval message 704b by the time period T. Accordingly, the time between the first outgoing bus interval message 706a and the second outgoing bus interval message 706b is T-A, and the time between the second outgoing bus interval message 706b and the second expected time of receipt 708b is T.

In FIG. 7B, the first original bus interval message 702a is generated by the host device 102, a first incoming bus interval message 704a is generated by the UFP device 104, and is received by the DFP device 106. In response, the DFP device 106 transmits the first outgoing bus interval message 706a, and establishes the first expected time of receipt 708a at a time T after the time of receipt of the first incoming bus interval message 704a (as described in FIG. 6).

The host device 102, after the time period T, generates a second original bus interval message 702b. In response, the UFP device 104 generates a second incoming bus interval message 704b. The second incoming bus interval message 704b experiences a larger amount of latency on the extension medium 110 than the first incoming bus interval message 704a (larger by an amount B), and so the second incoming bus interval message 704b arrives at the DFP device 106 after the expected time of receipt 708a during the soft threshold (that is, between the first expected time of receipt 708a and the later soft threshold time).

Because the first expected time of receipt 708a occurred before receipt of the second incoming bus interval message 704b, the DFP device 106 generated the second outgoing bus interval message 706b at the first expected time of receipt 708a. Accordingly, in FIG. 7B, the first expected time of receipt 708a and the second outgoing bus interval message 706b are illustrated on top of each other since they occur at the same time. By transmitting the second outgoing bus interval message 706b at the first expected time of receipt 708a, the DFP device 106 ensures that the time period between the first outgoing bus interval message 706a and the second outgoing bus interval message 706b is at most T.

Subsequently, the DFP device 106 receives the second incoming bus interval message 704b after the first expected time of receipt 708a but before the later soft threshold time. In response, the DFP device 106 establishes a second expected time of receipt 708b at a time that is after the time of receipt of the second incoming bus interval message 704b by the time period T. Accordingly, the time between the first outgoing bus interval message 706a and the second outgoing bus interval message 706b is T, and the time between the second outgoing bus interval message 706b and the second expected time of receipt 708b is T+B.

Figure 8A:
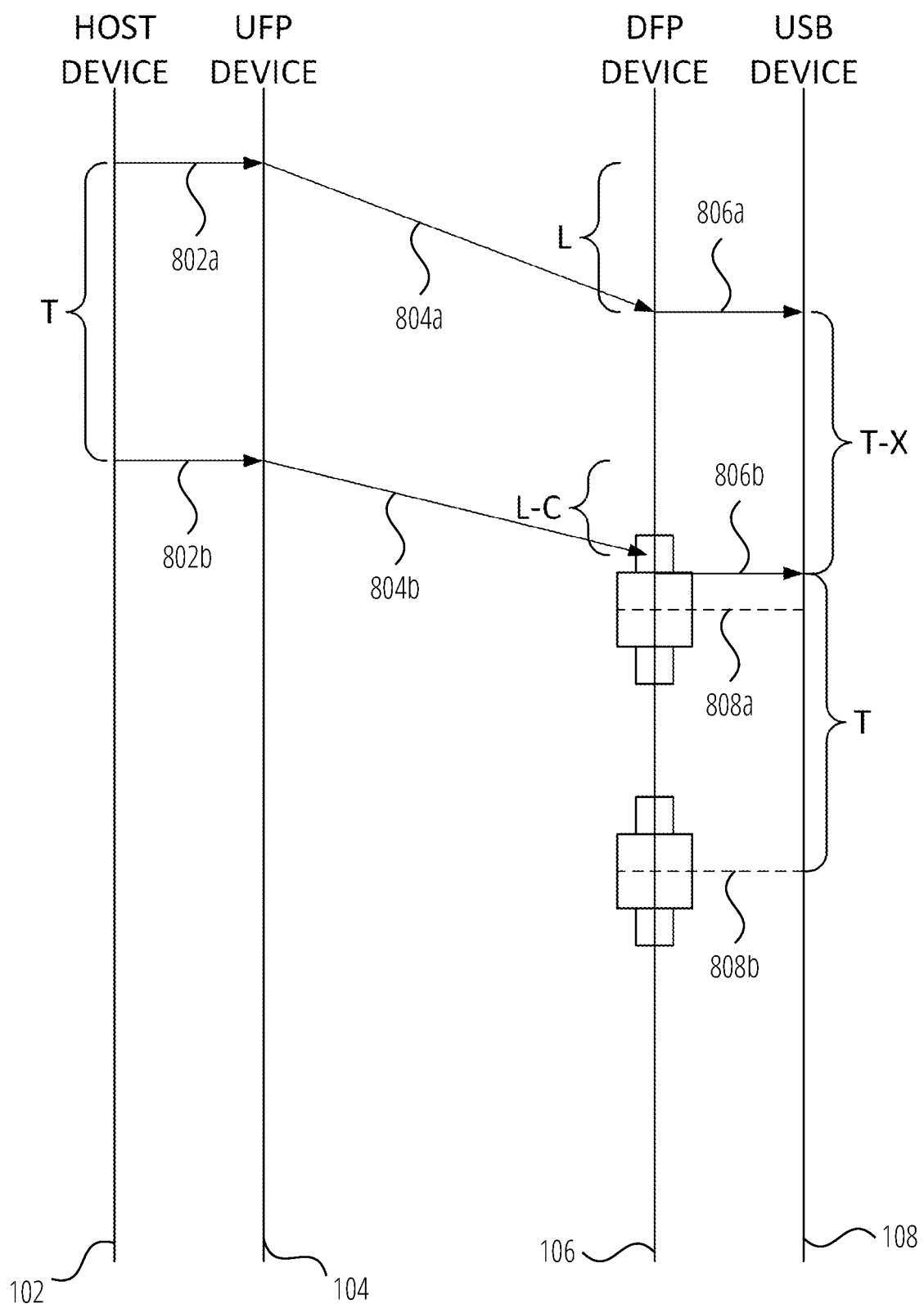
FIG. 8A and FIG. 8B are sequence diagrams that illustrate actions taken by a DFP device upon receiving an incoming bus interval message within a hard threshold according to various aspects of the present disclosure.
Figure 8B:
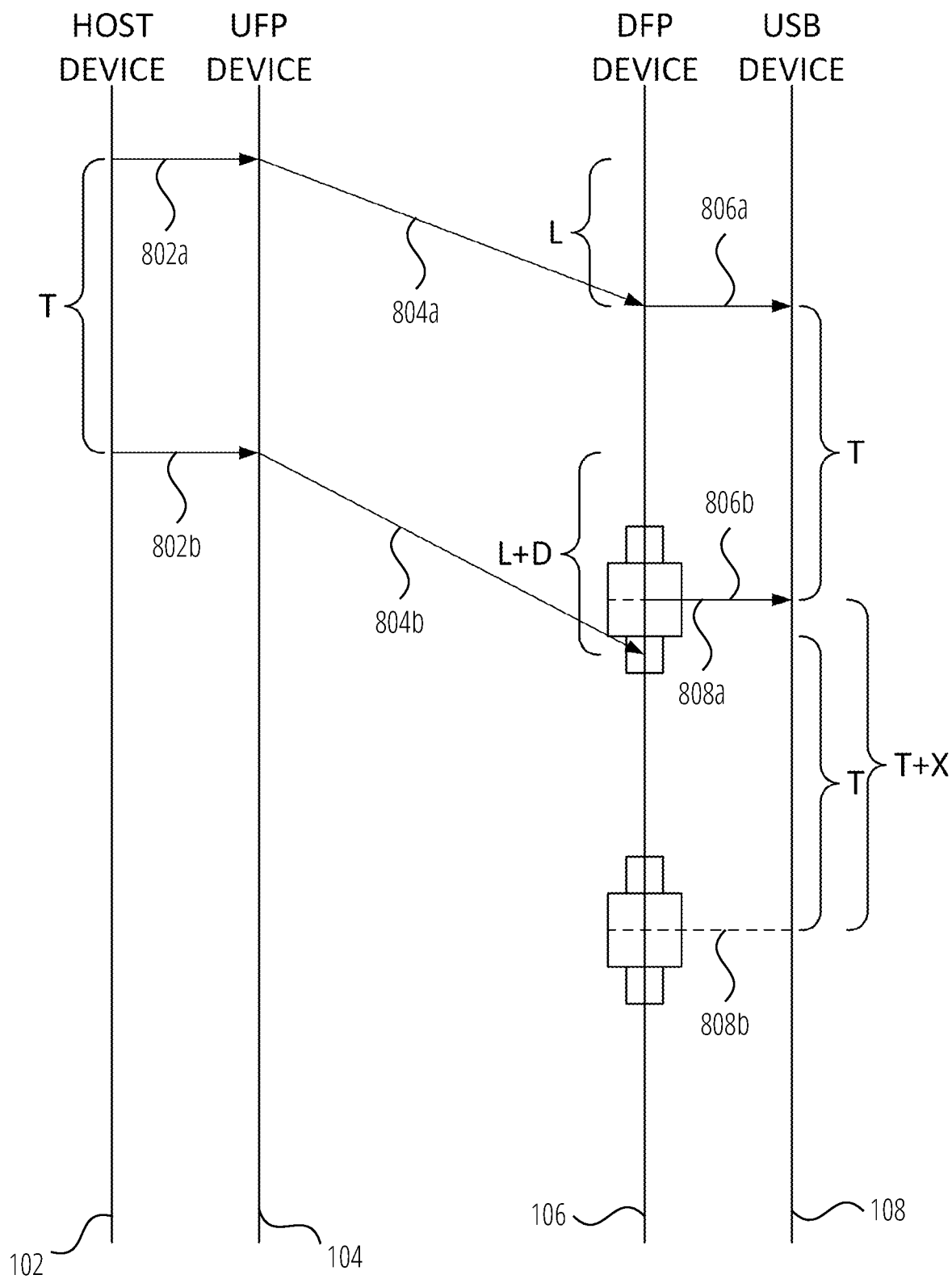

FIG. 8A and FIG. 8B are sequence diagrams that illustrate actions taken by a DFP device 106 upon receiving an incoming bus interval message within a hard threshold according to various aspects of the present disclosure. In FIG. 8A, the incoming bus interval message is received between an earlier soft threshold time and an earlier hard threshold time, while in FIG. 8B, the incoming bus interval message is received between a later soft threshold time and a later hard threshold time.

In FIG. 8A, the first original bus interval message 802a is generated by the host device 102, a first incoming bus interval message 804a is generated by the UFP device 104, and is received by the DFP device 106. In response, the DFP device 106 transmits the first outgoing bus interval message 806a, and establishes the first expected time of receipt 808a at a time T after the time of receipt of the first incoming bus interval message 804a (as described in FIG. 6).

The host device 102, after the time period T, generates a second original bus interval message 802b. The UFP device 104 transmits a second incoming bus interval message 804b to the DFP device 106. The second incoming bus interval message 804b experiences a smaller amount of latency on the extension medium 110 than the first incoming bus interval message 804a (smaller by an amount C), and so the second incoming bus interval message 804b arrives at the DFP device 106 during the hard threshold (that is, between the earlier hard threshold time and the earlier soft threshold time).

In response to receiving the second incoming bus interval message 804b between the earlier hard threshold time and the earlier soft threshold time, the DFP device 106 waits until the earlier soft threshold time, and then transmits a second outgoing bus interval message 806b at the earlier soft threshold time. The DFP device 106 also establishes a second expected time of receipt 808b that is after the earlier soft threshold time by the time period T.

At a high level, FIG. 8A illustrates that when an incoming bus interval message arrives before the soft threshold but during the hard threshold, the DFP device 106 moves the corresponding outgoing bus interval message and the next expected time of receipt, but only by the amount of the earlier soft threshold time. This places an upper limit (that is, the time period X) on the amount that the outgoing bus interval message and the next expected time of receipt will be adjusted to be earlier between consecutive bus interval messages, and helps maintain stability of the communication between the host device 102 and the USB devices 108.

In FIG. 8B, the first original bus interval message 802a is generated by the host device 102, a first incoming bus interval message 804a is generated by the UFP device 104, and is received by the DFP device 106. In response, the DFP device 106 transmits the first outgoing bus interval message 806a, and establishes the first expected time of receipt 808a at a time T after the time of receipt of the first incoming bus interval message 804a (as described in FIG. 6).

The host device 102, after the time period T, generates a second original bus interval message 902b. In response, the UFP device 104 generates a second incoming bus interval message 804b. The second incoming bus interval message 804b experiences a larger amount of latency on the extension medium 110 than the first incoming bus interval message 804a (larger by an amount D), and so the second incoming bus interval message 804b arrives at the DFP device 106 after the expected time of receipt 808a during the hard threshold (that is, between the later soft threshold time and the later hard threshold time).

As with FIG. 7B, because the first expected time of receipt 808a occurred before receipt of the second incoming bus interval message 804b, the DFP device 106 generated the second outgoing bus interval message 806b at the first expected time of receipt 808a. Accordingly, in FIG. 8B, the first expected time of receipt 808a and the second outgoing bus interval message 806b are illustrated on top of each other since they occur at the same time. Again, by transmitting the second outgoing bus interval message 806b at the first expected time of receipt 808a, the DFP device 106 ensures that the time period between the first outgoing bus interval message 806a and the second outgoing bus interval message 806b is at most T.

Subsequently, the DFP device 106 receives the second incoming bus interval message 804b after the later soft threshold time but before the later hard threshold time. In response, the DFP device 106 establishes a second expected time of receipt 808b at a time that is after the later soft threshold time by the time period T. Accordingly, the time between the first outgoing bus interval message 806a and the second outgoing bus interval message 806b is T, and the time between the second outgoing bus interval message 806b and the second expected time of receipt 808b is T+X.

As with FIG. 8A, FIG. 8B illustrates that this technique places an upper limit (that is, the time period X) on the amount that the next expected time of receipt will be adjusted to be later between consecutive bus interval messages to help maintain stability of the communication between the host device 102 and the USB devices 108.

Figure 9A:
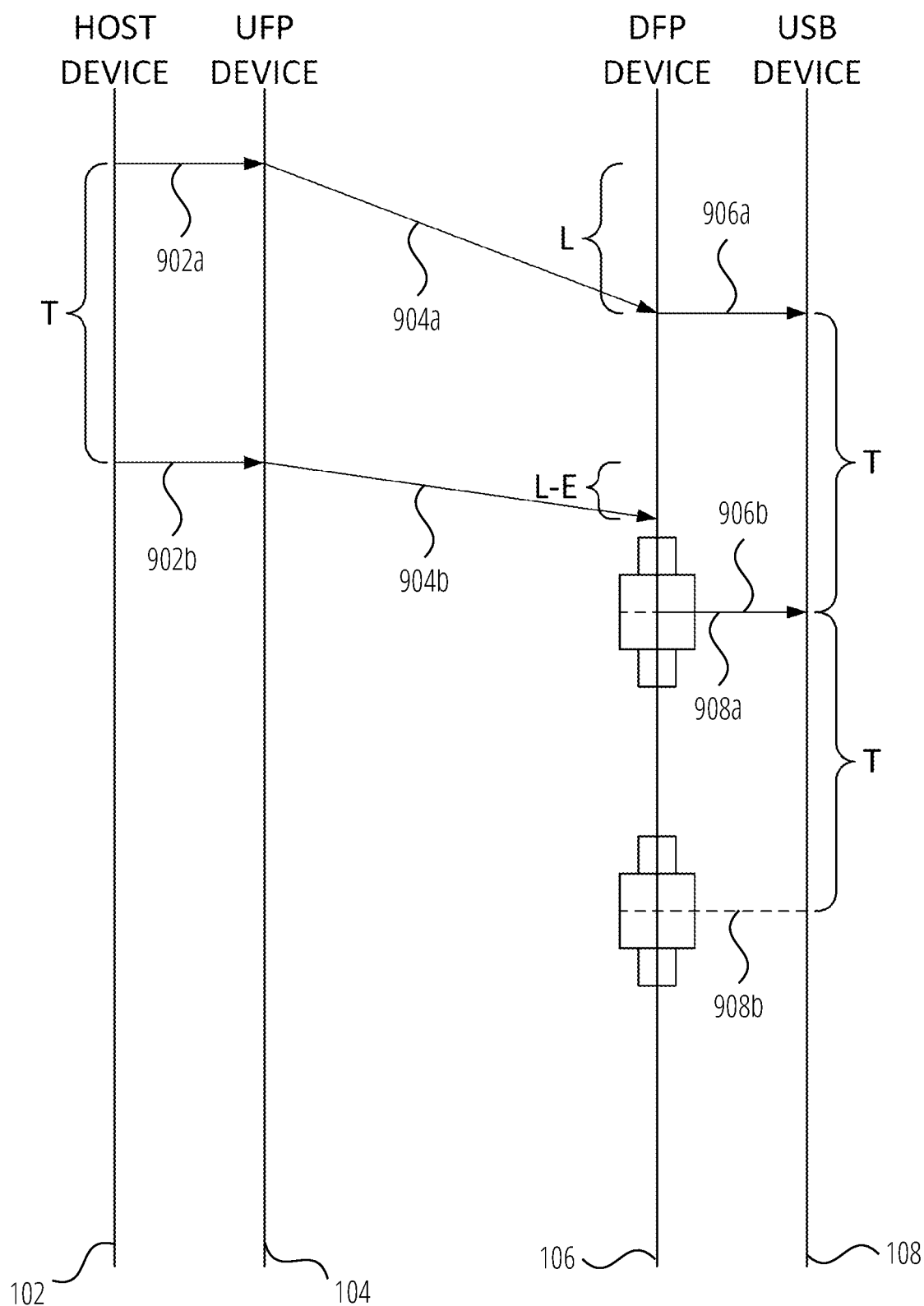
FIG. 9A and FIG. 9B are sequence diagrams that illustrate actions taken by a DFP device upon receiving an incoming bus interval message outside of a hard threshold according to various aspects of the present disclosure.
Figure 9B:
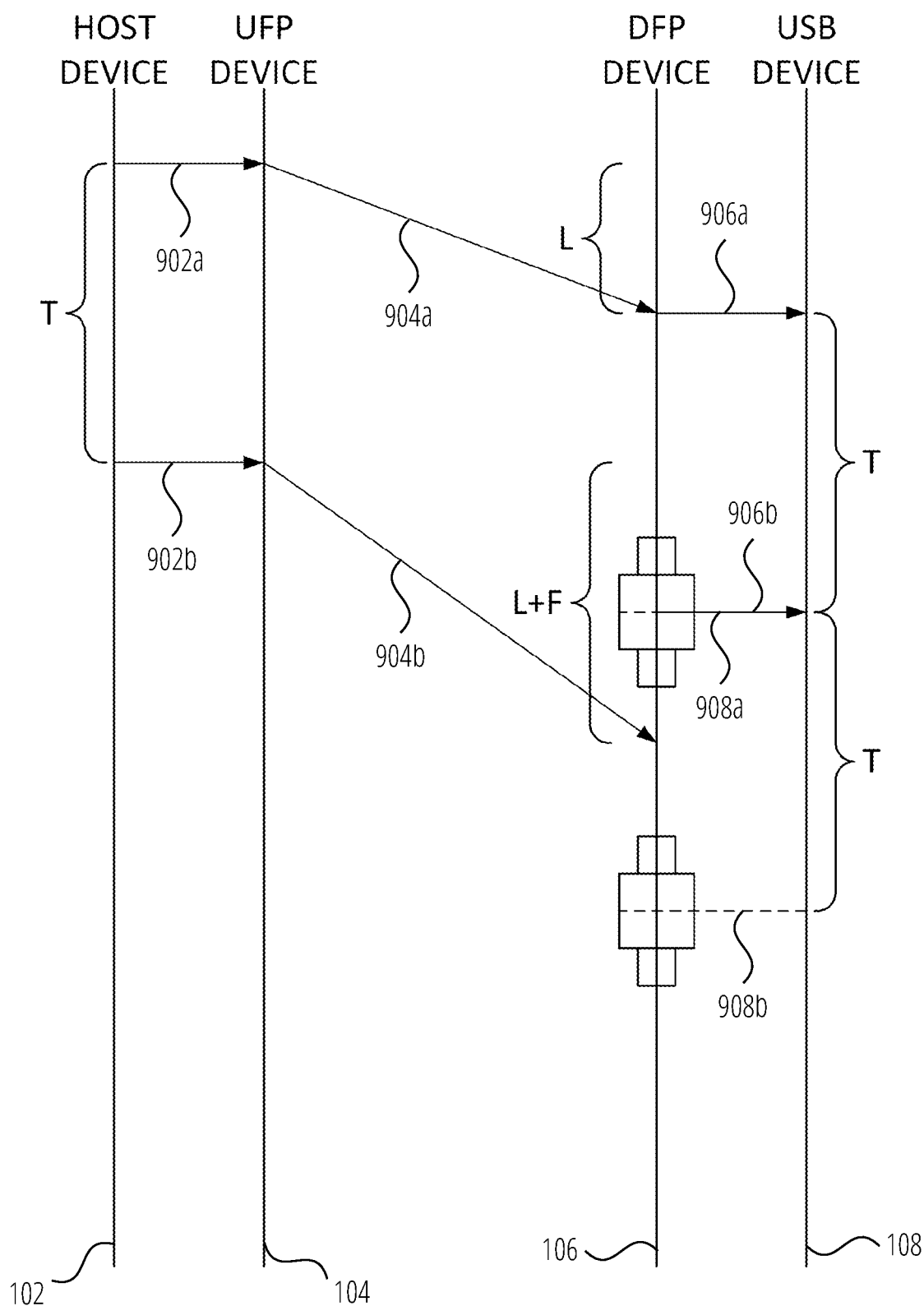

FIG. 9A and FIG. 9B are sequence diagrams that illustrate actions taken by a DFP device 106 upon receiving an incoming bus interval message outside of a hard threshold according to various aspects of the present disclosure. In FIG. 9A, the incoming bus interval message is received before an earlier hard threshold time, while in FIG. 9B, the incoming bus interval message is received after a later hard threshold time.

In FIG. 9A, the first original bus interval message 902a is generated by the host device 102, a first incoming bus interval message 904a is generated by the UFP device 104, and is received by the DFP device 106. In response, the DFP device 106 transmits a first outgoing bus interval message 906a, and establishes the first expected time of receipt 908a at a time T after the time of receipt of the first incoming bus interval message 904a (as described in FIG. 6).

The host device 102, after the time period T, generates a second original bus interval message 902b. The UFP device 104 transmits a second incoming bus interval message 904b to the DFP device 106. The second incoming bus interval message 904b experiences a smaller amount of latency on the extension medium 110 than the first incoming bus interval message 904a (smaller by an amount E), and so the second incoming bus interval message 904b arrives at the DFP device 106 before the hard threshold (that is, before the earlier hard threshold time).

In response to receiving the second incoming bus interval message 904b before the earlier hard threshold time, the DFP device 106 ignores the timing of the second incoming bus interval message 904b. Instead, the DFP device 106 generates a second outgoing bus interval message 906b at the first expected time of receipt 908a, and establishes a second expected time of receipt 908b that is after the first expected time of receipt 908a by the time period T. As with the previous illustrations, the second outgoing bus interval message 906b and the first expected time of receipt 908a are illustrated on top of each other because they occur at the same time.

Receiving the second incoming bus interval message 904b so much earlier than the first expected time of receipt 908a may indicate problems with the transmission of the second incoming bus interval message 904b. For example, an incoming bus interval message received before the hard threshold may not be an incoming bus interval message corresponding to the expected bus interval, but may be an incoming bus interval message associated with a previous bus interval that had never arrived. It has been found that ignoring an incoming bus interval message that arrives so early and instead generating the second outgoing bus interval message 906b at the first expected time of receipt 908a leads to greater stability of the communication between the host device 102 and the USB devices 108.

In FIG. 9B, the first original bus interval message 902a is generated by the host device 102, a first incoming bus interval message 904a is generated by the UFP device 104, and is received by the DFP device 106. In response, the DFP device 106 transmits the first outgoing bus interval message 906a, and establishes the first expected time of receipt 908a at a time T after the time of receipt of the first incoming bus interval message 904a (as described in FIG. 6).

The host device 102, after the time period T, generates a second original bus interval message 902b. In response, the UFP device 104 generates a second incoming bus interval message 904b. The second incoming bus interval message 904b experiences a larger amount of latency on the extension medium 110 than the first incoming bus interval message 904a (larger by an amount F), and so the second incoming bus interval message 904b arrives at the DFP device 106 after the hard threshold (that is, after the later hard threshold time).

As with FIG. 7B and FIG. 8B, because the first expected time of receipt 908a occurred before the receipt of the second incoming bus interval message 904b, the DFP device 106 generated the second outgoing bus interval message 906b at the first expected time of receipt 908a, in order to ensure that the time period between the first outgoing bus interval message 906a and the second outgoing bus interval message 906b is T. Again, the second outgoing bus interval message 906b and the first expected time of receipt 908a are illustrated on top of each other because they occur at the same time.

Subsequently, the DFP device 106 detects that the later hard threshold time occurs without having received the second incoming bus interval message 904b. In response, the DFP device 106 establishes a second expected time of receipt 908b at a time that is after the first expected time of receipt 908b by the time period T. When the second incoming bus interval message 904b is received after the later hard threshold time, it is ignored by the DFP device 106.

Failing to receive the second incoming bus interval message 904b by the later hard threshold time may indicate problems on the extension medium 110. For example, it may indicate that the second incoming bus interval message 904b has been lost, and may never arrive at the DFP device 106, or may arrive too late for an appropriate outgoing bus interval message to be generated. In such a case, the DFP device 106 generates the outgoing bus interval message based on the interval T. It has been found that using the interval T when the second incoming bus interval message 904b has not been received by the later hard threshold time leads to greater stability of the communication between the host device 102 and the USB devices 108.

All of the sequences illustrated in FIG. 7A, FIG. 7B, FIG. 8A, FIG. 8B, FIG. 9A, and FIG. 9B assume that the incoming bus interval messages have arrived in the expected order. According to the USB Specification, each original bus interval message includes a count value which is incremented by one for each original bus interval message before eventually rolling over. By comparing the count value for consecutively received original bus interval messages, it can be determined whether the original bus interval messages have arrived in order, or whether an original bus interval message has been skipped or is otherwise missing. Each incoming bus interval message includes a similar value (or the same value from the original bus interval message).

Accordingly, the sequences illustrated in FIG. 7A, FIG. 7B, FIG. 8A, and FIG. 8B assume that, when the second incoming bus interval message is checked to ensure that its count value is the next expected count value after the count value of the first incoming bus interval message, this check is successful thus indicating that the second incoming bus interval message is in the expected order. If this check is unsuccessful (i.e., the count value of the second incoming bus interval message is not the expected value), the second incoming bus interval message 704b is ignored and treated as if it never arrived or arrived outside of the hard threshold as illustrated in FIG. 9A and/or FIG. 9B.

Figure 10:
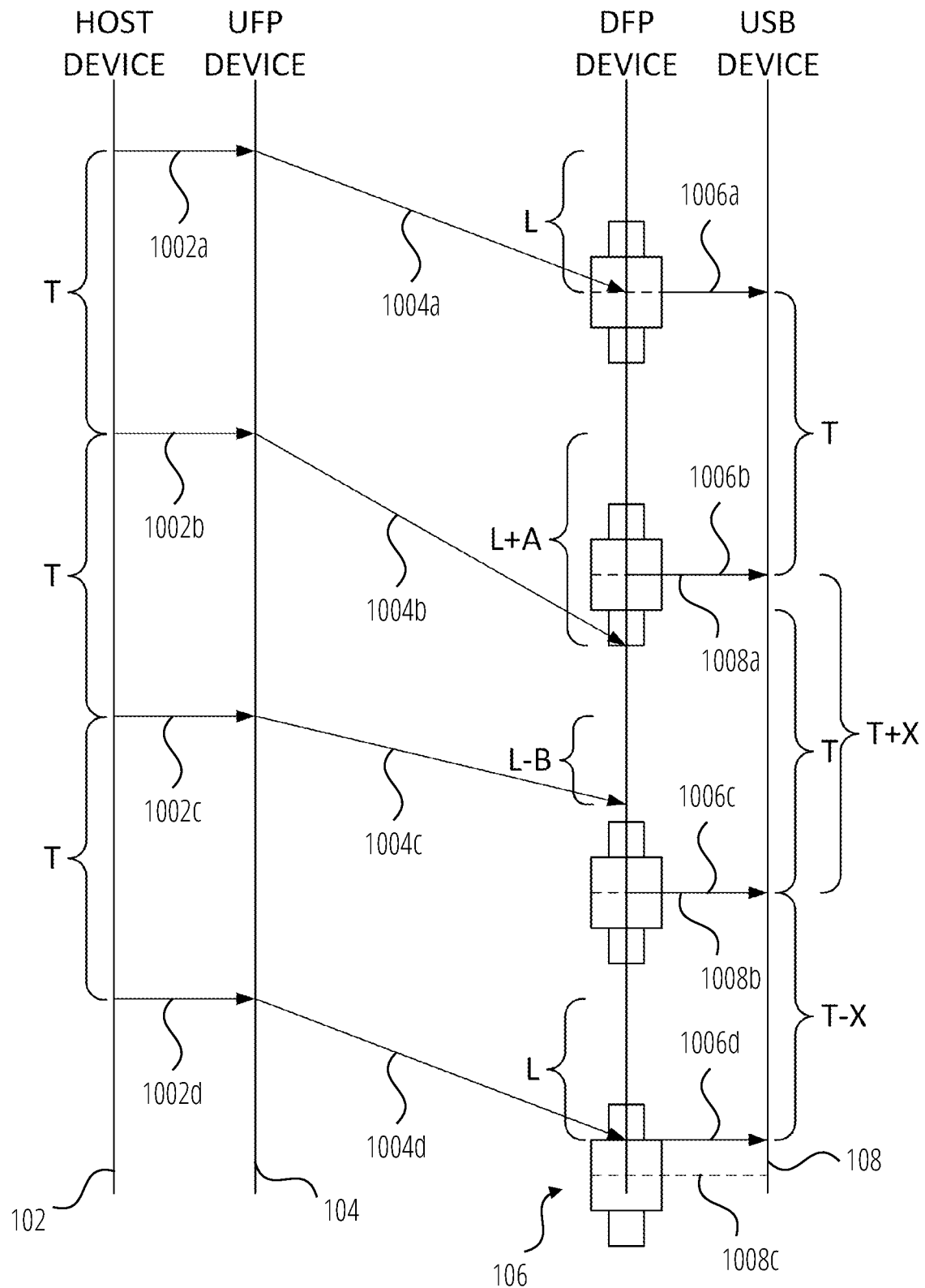
FIG. 10 is a sequence diagram that illustrates how the techniques illustrated in FIG. 7A, FIG. 7B, FIG. 8A, FIG. 8B, FIG. 9A, and FIG. 9B combine to address the issues of changes in latency compounding timing differences between outgoing bus interval messages illustrated in FIG. 5.

The above figures illustrate actions taken by the DFP device 106 based on the timing at which a subsequent incoming bus interval message is received. While the actions taken for any given subsequent incoming bus interval message are relatively simple, these actions serve to ensure that the changes in timing of series of outgoing bus interval messages do not compound with each other, and thus ensure that the communication with the USB devices 108 remains stable. FIG. 10 is a sequence diagram that illustrates how the techniques illustrated in FIG. 7A, FIG. 7B, FIG. 8A, FIG. 8B, FIG. 9A, and FIG. 9B combine to address the issues of changes in latency compounding timing differences between outgoing bus interval messages illustrated in FIG. 5.

In FIG. 10, the timing of the generation of original bus interval messages 1002a-1002d, the incoming bus interval messages 1004a-1004d, the latency experienced by the incoming bus interval messages 1004a-1004d, and the transmission of the first outgoing bus interval message 1006a is the same as illustrated in FIG. 5. As a reminder, after experiencing latency of L, L+A, L−B, and L, the DFP device 106 illustrated in FIG. 5 that did not use the techniques described above ended up generating outgoing bus interval messages 506a-506d with intervals of T+A, T−A−B, and T+B.

In FIG. 10, after receiving the first incoming bus interval message 1004a, the DFP device 106 establishes a first expected time of receipt 1008a at a time T after receipt of the first incoming bus interval message 1004a. Because the DFP device 106 has not received the second incoming bus interval message 1004b by the first expected time of receipt 1008a, the DFP device 106 transmits the second outgoing bus interval message 1006b at the first expected time of receipt 1008a.

The DFP device 106 then receives the second incoming bus interval message 1004b at the later hard threshold time (which, for purposes of discussion, will be considered within the hard threshold, though in some embodiments, arriving at the later hard threshold time may be considered outside the hard threshold). As described in FIG. 8B, in response to receiving the second incoming bus interval message 1004b between the later soft threshold time and the later hard threshold time, the DFP device 106 establishes a second expected time of receipt 1008b at a time that is after the earlier soft threshold time by an amount T. As such, the second expected time of receipt 1008b is moved later by an amount X (the difference between the later soft threshold time and the first expected time of receipt 1008a) instead of the larger amount of latency A.

The DFP device 106 receives the third incoming bus interval message 1004c before the earlier hard threshold time established for the second expected time of receipt 1008b. As described in FIG. 9A, the DFP device 106 ignores the timing of the third incoming bus interval message 1004c because it is received before the earlier hard threshold time. Instead of making further adjustments, the DFP device 106 transmits the third outgoing bus interval message 1006c at the second expected time of receipt 1008b, and establishes a third expected time of receipt 1008c that is after the second expected time of receipt 1008b by an amount T. By ignoring the timing of the third incoming bus interval message 1004c, the compounded error of T−A−B that was experienced between the second outgoing bus interval message 506b and the third outgoing bus interval message 506c in FIG. 5 has been erased.

The DFP device 106 receives the fourth incoming bus interval message 1004d at the earlier soft threshold time established for the third expected time of receipt 1008c. As described in FIG. 7A, the DFP device 106 transmits a fourth outgoing bus interval message 1006d as soon as possible after receiving the fourth incoming bus interval message 1004d, since it arrived within the soft threshold. Though not illustrated, the DFP device 106 also adjusts a timing of a fourth expected time of receipt to be after the time the fourth incoming bus interval message 1004d was received by the amount T. By moving up the transmission of the fourth outgoing bus interval message 1006d to match the time the fourth incoming bus interval message 1004d was received, the timing between the third outgoing bus interval message 1006c and the fourth outgoing bus interval message 1006d is reduced by X.

One will note that, in contrast to the compounding and widely varying differences in timing that were experienced in FIG. 5, the techniques described herein and as shown in FIG. 10 have eliminated these issues, and have limited differences in timing between consecutive outgoing bus interval messages to plus or minus 2X. This small amount of latency can be compensated for within the USB Specifications, and so the host device 102 and the USB devices 108 can remain synchronized as if the extension medium 110 was not present.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for generating bus interval messages by a downstream USB extension device in a USB extension environment, the method comprising:
    transmitting, by the downstream USB extension device via a USB downstream facing port, a first outgoing bus interval message in response to receiving a first incoming bus interval message from an upstream USB extension device via an extension medium at a first time;
    determining, by the downstream USB extension device, an expected time of receipt of a second incoming bus interval message based on the first time;
    in response to determining that the second incoming bus interval message has been received at a reception time that is before the expected time of receipt, transmitting, by the downstream USB extension device via the USB downstream facing port, a second outgoing bus interval message at a second time based on a difference between the reception time and the expected time of receipt; and
    in response to determining that the second incoming bus interval message has not been received before the expected time of receipt, transmitting, by the downstream USB extension device via the USB downstream facing port, the second outgoing bus interval message at the expected time of receipt.

2. The method of claim 1, wherein transmitting the second outgoing bus interval message at the second time based on the difference between the reception time and the expected time of receipt includes:
    in response to determining that the reception time is between the expected time of receipt and an earlier soft threshold time, using the reception time as the second time;
    wherein the earlier soft threshold time is before the expected time of receipt.

3. The method of claim 2, further comprising:
    setting a second expected time of receipt for a third incoming bus interval message as a predetermined amount of time after the reception time.

4. The method of claim 1, wherein transmitting the second outgoing bus interval message at the second time based on the difference between the reception time and the expected time of receipt includes:
    in response to determining that the reception time is between an earlier soft threshold time and an earlier hard threshold time, using the earlier soft threshold time as the second time;
    wherein the earlier soft threshold time is before the expected time of receipt, and the earlier hard threshold time is before the earlier soft threshold time.

5. The method of claim 4, further comprising:
    setting a second expected time of receipt for a third incoming bus interval message as a predetermined amount of time after the earlier soft threshold time.

6. The method of claim 1, wherein transmitting the second outgoing bus interval message at the second time based on the difference between the reception time and the expected time of receipt includes:
    in response to determining that the reception time is earlier than an earlier hard threshold time, using the expected time of receipt as the second time.

7. The method of claim 1, further comprising:
    in response to determining that the second incoming bus interval message has been received at a reception time that is between the expected time of receipt and a later soft threshold time, setting a second expected time of receipt for a third incoming bus interval message as a predetermined amount of time after the reception time;
    wherein the later soft threshold time is after the expected time of receipt.

8. The method of claim 1, further comprising:
    in response to determining that the second incoming bus interval message has been received at a reception time that is between a later soft threshold time and a later hard threshold time, setting a second expected time of receipt for a third incoming bus interval message as a predetermined amount of time after the later soft threshold time;
    wherein the later soft threshold time is after the expected time of receipt; and
    wherein the later hard threshold time is after the later soft threshold time.

9. The method of claim 1, further comprising:
    in response to determining that the second incoming bus interval message has not been received by a later hard threshold time, setting a second expected time of receipt for a third incoming bus interval message as a predetermined amount of time after the expected time of receipt.

10. A downstream USB extension device configured to perform actions comprising:
    transmitting, by the downstream USB extension device via a USB downstream facing port, a first outgoing bus interval message in response to receiving a first incoming bus interval message from an upstream USB extension device via an extension medium at a first time;
    determining, by the downstream USB extension device, an expected time of receipt of a second incoming bus interval message based on the first time;
    in response to determining that the second incoming bus interval message has been received at a reception time that is before the expected time of receipt, transmitting, by the downstream USB extension device via the USB downstream facing port, a second outgoing bus interval message at a second time based on a difference between the reception time and the expected time of receipt; and
    in response to determining that the second incoming bus interval message has not been received before the expected time of receipt, transmitting, by the downstream USB extension device via the USB downstream facing port, the second outgoing bus interval message at the expected time of receipt.

11. The downstream USB extension device of claim 10, wherein transmitting the second outgoing bus interval message at the second time based on the difference between the reception time and the expected time of receipt includes:
in response to determining that the reception time is between the expected time of receipt and an earlier soft threshold time, using the reception time as the second time;
wherein the earlier soft threshold time is before the expected time of receipt.

12. The downstream USB extension device of claim 11, wherein the actions further comprise:
setting a second expected time of receipt for a third incoming bus interval message as a predetermined amount of time after the reception time.

13. The downstream USB extension device of claim 10, wherein transmitting the second outgoing bus interval message at the second time based on the difference between the reception time and the expected time of receipt includes:
in response to determining that the reception time is between an earlier soft threshold time and an earlier hard threshold time, using the earlier soft threshold time as the second time;
wherein the earlier soft threshold time is before the expected time of receipt, and the earlier hard threshold time is before the earlier soft threshold time.

14. The downstream USB extension device of claim 13, wherein the actions further comprise:
setting a second expected time of receipt for a third incoming bus interval message as a predetermined amount of time after the earlier soft threshold time.

15. The downstream USB extension device of claim 10, wherein transmitting the second outgoing bus interval message at the second time based on the difference between the reception time and the expected time of receipt includes:
in response to determining that the reception time is earlier than an earlier hard threshold time, using the expected time of receipt as the second time.

16. The downstream USB extension device of claim 10, wherein the actions further comprise:
in response to determining that the second incoming bus interval message has been received at a reception time that is between the expected time of receipt and a later soft threshold time, setting a second expected time of receipt for a third incoming bus interval message as a predetermined amount of time after the reception time;
wherein the later soft threshold time is after the expected time of receipt.

17. The downstream USB extension device of claim 10, wherein the actions further comprise:
in response to determining that the second incoming bus interval message has been received at a reception time that is between a later soft threshold time and a later hard threshold time, setting a second expected time of receipt for a third incoming bus interval message as a predetermined amount of time after the later soft threshold time;
wherein the later soft threshold time is after the expected time of receipt; and
wherein the later hard threshold time is after the later soft threshold time.

18. The downstream USB extension device of claim 10, wherein the actions further comprise:
in response to determining that the second incoming bus interval message has not been received by a later hard threshold time, setting a second expected time of receipt for a third incoming bus interval message as a predetermined amount of time after the expected time of receipt.

19. A system, comprising:
an extension medium; and
a downstream USB extension device communicatively coupled to the extension medium and configured to perform actions comprising:
transmitting, by the downstream USB extension device via a USB downstream facing port, a first outgoing bus interval message in response to receiving a first incoming bus interval message from an upstream USB extension device via the extension medium at a first time;
determining, by the downstream USB extension device, an expected time of receipt of a second incoming bus interval message based on the first time;
in response to determining that the second incoming bus interval message has been received at a reception time that is before the expected time of receipt, transmitting, by the downstream USB extension device via the USB downstream facing port, a second outgoing bus interval message at a second time based on a difference between the reception time and the expected time of receipt; and
in response to determining that the second incoming bus interval message has not been received before the expected time of receipt, transmitting, by the downstream USB extension device via the USB downstream facing port, the second outgoing bus interval message at the expected time of receipt.

20. The system of claim 19, wherein the extension medium includes a copper cable, a fiber-optic cable, or a wireless medium.

* * * * *